United States Patent
Gilson et al.

(10) Patent No.: US 8,973,364 B2
(45) Date of Patent: Mar. 10, 2015

(54) GAS TURBINE ENGINE WITH NOISE ATTENUATING VARIABLE AREA FAN NOZZLE

(75) Inventors: Jonathan Gilson, West Hartford, CT (US); Dennis Cicon, Coventry, CT (US); Oliver V. Atassi, Longmeadow, MA (US)

(73) Assignee: United Technologies Corporation, Hartford, CT (US)

( * ) Notice: Subject to any disclaimer, the term of this patent is extended or adjusted under 35 U.S.C. 154(b) by 1906 days.

(21) Appl. No.: 12/147,432

(22) Filed: Jun. 26, 2008

(65) Prior Publication Data
US 2009/0320488 A1 Dec. 31, 2009

(51) Int. Cl.
*F02K 1/09* (2006.01)
*F02K 1/00* (2006.01)
*F02K 1/82* (2006.01)

(52) U.S. Cl.
CPC . *F02K 1/002* (2013.01); *F02K 1/09* (2013.01); *F02K 1/827* (2013.01); *F05D 2260/96* (2013.01)
USPC .............. 60/725; 60/770; 60/771; 60/226.2; 60/226.1; 60/226.3; 239/265.33; 239/265.31; 239/265.13; 181/213; 181/215; 181/216

(58) Field of Classification Search
USPC ............ 181/215, 213, 216, 222; 60/770, 771, 60/226.1, 226.2, 226.3; 239/265.19, 239/265.25, 265.33
See application file for complete search history.

(56) References Cited

U.S. PATENT DOCUMENTS

| | | | |
|---|---|---|---|
| 2,340,417 A | 2/1944 | Ellett | |
| 3,316,714 A | 5/1967 | Smith et al. | |
| 3,820,628 A | 6/1974 | Hanson | |
| 3,820,719 A * | 6/1974 | Clark | 239/265.31 |
| 4,130,175 A * | 12/1978 | Hehmann | 181/290 |
| 4,475,624 A * | 10/1984 | Bourland et al. | 181/292 |
| 4,522,283 A * | 6/1985 | Smith | 181/175 |
| 5,169,288 A | 12/1992 | Gliebe et al. | |
| 5,272,869 A | 12/1993 | Dawson et al. | |
| 5,594,216 A * | 1/1997 | Yasukawa et al. | 181/213 |
| 5,613,649 A | 3/1997 | Schlinker et al. | |
| 5,778,659 A | 7/1998 | Duesler et al. | |
| 5,806,302 A * | 9/1998 | Cariola et al. | 60/204 |
| 6,004,095 A | 12/1999 | Waitz et al. | |
| 6,139,259 A | 10/2000 | Ho et al. | |
| 6,439,840 B1 | 8/2002 | Tse | |
| 6,688,107 B2 * | 2/2004 | Ono et al. | 60/725 |
| 6,789,998 B2 | 9/2004 | Chen et al. | |
| 6,905,303 B2 | 6/2005 | Liu et al. | |
| 7,018,172 B2 | 3/2006 | Prasad et al. | |
| 7,118,331 B2 | 10/2006 | Shahpar | |
| 7,334,998 B2 | 2/2008 | Jones et al. | |

FOREIGN PATENT DOCUMENTS

| | | |
|---|---|---|
| GB | 2026622 | 2/1980 |
| WO | 2008045049 | 4/2008 |

OTHER PUBLICATIONS

Extended European Search Report, mailed Oct. 30, 2009.

\* cited by examiner

*Primary Examiner* — Phutthiwat Wongwian
*Assistant Examiner* — Steven Sutherland
(74) *Attorney, Agent, or Firm* — Carlson, Gaskey & Olds, P.C.

(57) ABSTRACT

A high-bypass gas turbine engine includes a variable area fan nozzle with an acoustic system having an acoustic impedance.

13 Claims, 5 Drawing Sheets

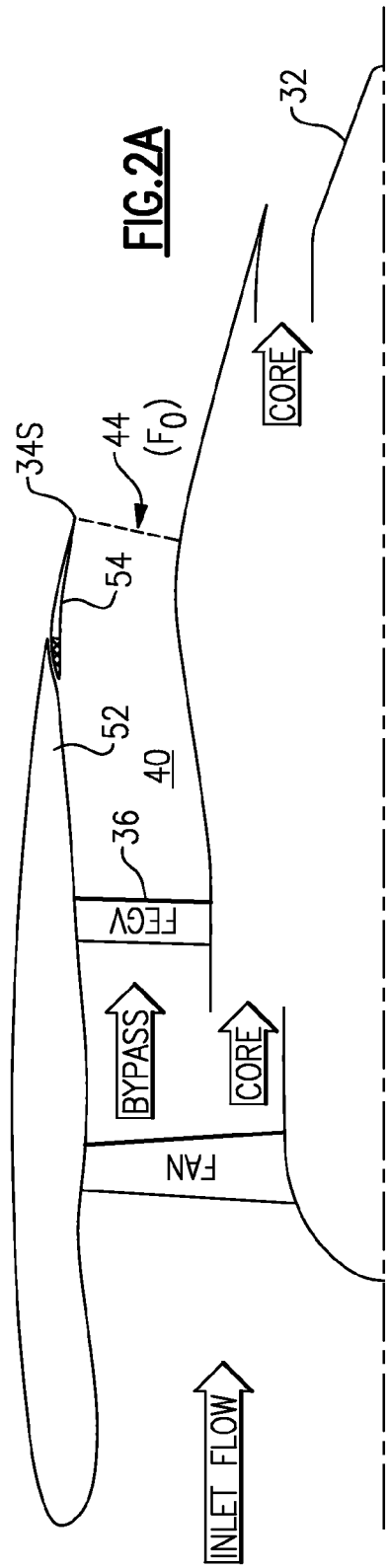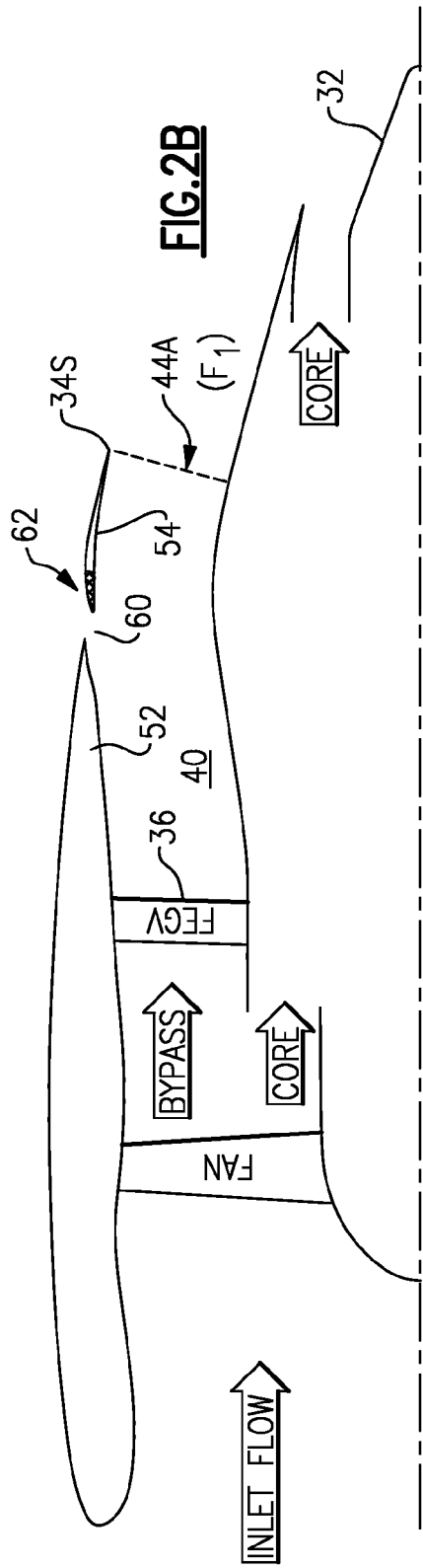

GAS TURBINE ENGINE WITH NOISE ATTENUATING VARIABLE AREA FAN NOZZLE

BACKGROUND OF THE INVENTION

The present invention relates to a gas turbine engine, and more particularly to a turbofan engine having a variable area fan nozzle (VAFN) with an acoustic system to attenuate leading edge noise and reduce the total effective perceived noise level (EPNL).

Gas turbine engines which have an engine cycle modulated with a variable area fan nozzle (VAFN) provide a smaller fan exit nozzle diameter during cruise conditions and a larger fan exit nozzle diameter during take-off and landing conditions.

The VAFN may generate significant noise as upstream turbulence interacts with the leading edge of the VAFN. The upstream turbulence may result from turbulent boundary layers which expand from the upstream fixed nacelle wall, turbulence which evolves from the upstream fan exit guide vane (FEGV) wakes or endwall effects, and flow separation that may occur from the contour of the upstream nacelle wall. The physical mechanism for leading edge VAFN noise, which exhibits acoustic dipole behavior, is fundamentally different from traditional jet exhaust mixing noise, which exhibits acoustic quadrupole behavior. Additionally, this excess noise is not significantly reduced in forward flight as typical jet exhaust mixing noise. Thus, the leading edge source is of significant importance in its contribution toward the effective perceived noise level (EPNL).

SUMMARY OF THE INVENTION

A nacelle assembly for a high-bypass gas turbine engine according to an exemplary aspect of the present invention includes: a variable area fan nozzle having a first fan nacelle section and a second fan nacelle section. The second fan nacelle section being axially movable relative the first fan nacelle section to define an auxiliary port to vary a fan nozzle exit area and adjust fan bypass airflow, the second fan nacelle section comprises an acoustic system which provides an acoustic impedance.

A method of reducing a total effective perceived noise level (EPNL) of a gas turbine engine with a variable area fan nozzle according to an exemplary aspect of the present invention includes a leading edge region with an acoustic system having an acoustic impedance when a second fan nacelle section is positioned at a non-closed position.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2A is a sectional side view of the VAFN in a closed position;

FIG. 2B is a sectional side view of the VAFN in an open position; and

DETAILED DESCRIPTION OF THE PREFERRED EMBODIMENT

Figure 1A:
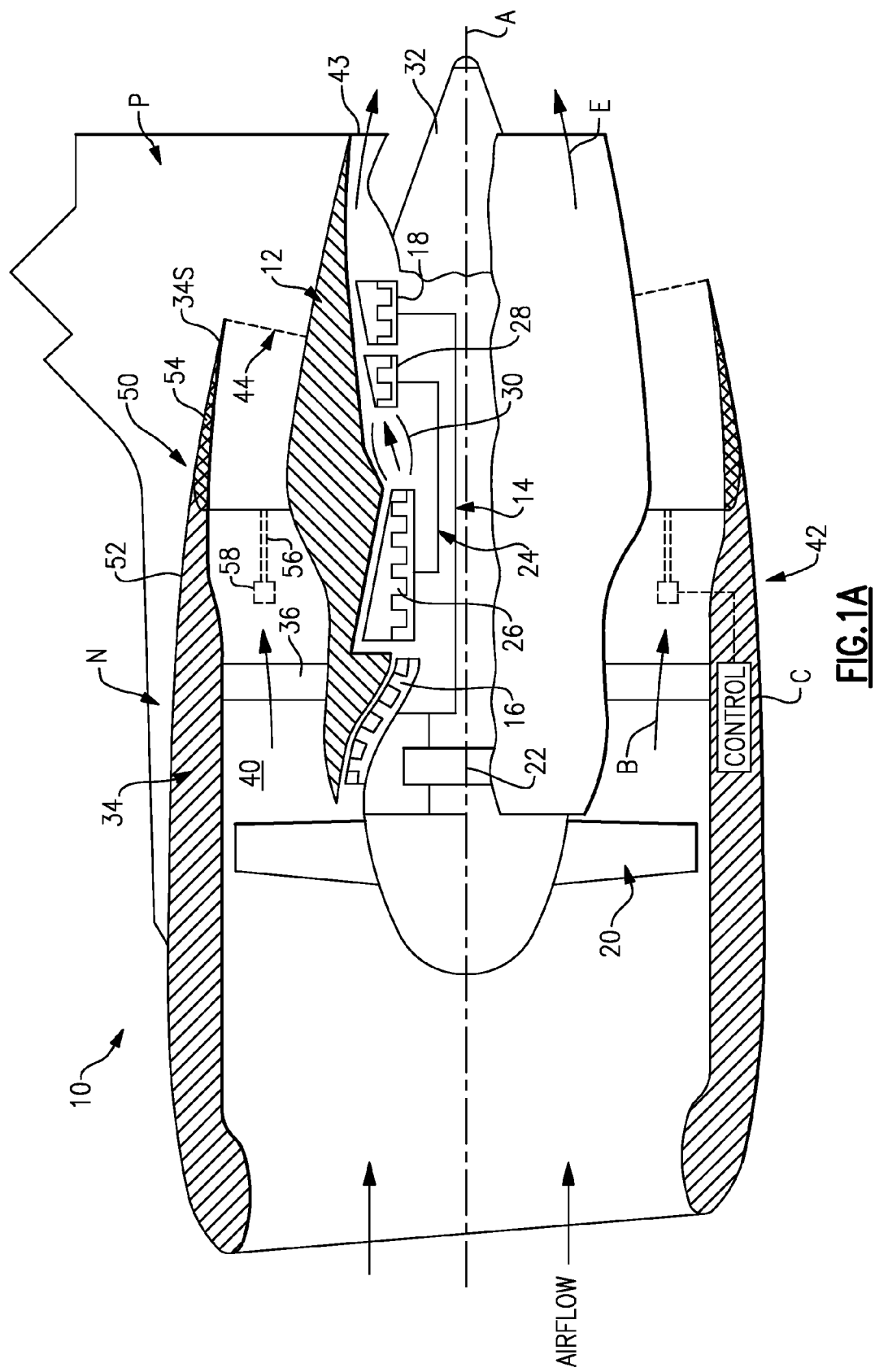
FIG. 1A is a general schematic partial fragmentary view of an exemplary gas turbine engine embodiment for use with the present invention.

FIG. 1A illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. The low spool 14 also drives a fan section 20 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in one non-limiting embodiment is a high-bypass geared architecture aircraft engine with a bypass ratio greater than ten (10:1), a turbofan diameter significantly larger than that of the low pressure compressor 16, and the low pressure turbine 18 with a pressure ratio greater than 5:1. The gear train 22 may be an epicycle gear train such as a planetary gear system or other gear system with a gear reduction ratio of greater than 2.5:1. It should be understood, however, that the above parameters are only exemplary of one non-limiting embodiment of a geared architecture engine and that this disclosure is applicable to other gas turbine engines including direct drive turbofans.

Airflow enters a fan nacelle 34, which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and through the gear train 22, the fan section 20 in response to the expansion. A core engine exhaust E exits the core nacelle 12 through a core nozzle 43 defined between the core nacelle 12 and a tail cone 32.

The core nacelle 12 is supported within the fan nacelle 34 by circumferentially space structures 36 often generically referred to as Fan Exit Guide Vanes (FEGVs). A bypass flow path 40 is defined between the core nacelle 12 and the fan nacelle 34. The engine 10 generates a high bypass flow arrangement with a bypass ratio in which approximately eighty percent of the airflow which enters the fan nacelle 34 becomes bypass flow B. The bypass flow B communicates through the generally annular bypass flow path 40 and is discharged from the engine 10 through a variable area fan nozzle (VAFN) 42 which defines a nozzle exit area 44 between the fan nacelle 34 and the core nacelle 12 at a fan nacelle end segment 34S of the fan nacelle 34 downstream of the fan section 20.

Thrust is a function of density, velocity, and area. One or more of these parameters can be manipulated to vary the amount and direction of thrust provided by the bypass flow B. The VAFN 42 operates to effectively vary the area of the fan nozzle exit area 44 to selectively adjust the pressure ratio of the bypass flow B in response to a controller C. Low pressure ratio turbofans are desirable for their high propulsive efficiency. However, low pressure ratio fans may be inherently susceptible to fan stability/flutter problems at low power and low flight speeds. The VAFN allows the engine to change to a more favorable fan operating line at low power, avoiding the instability region, and still provide the relatively smaller nozzle area necessary to obtain a high-efficiency fan operating line at cruise.

A significant amount of thrust is provided by the bypass flow B due to the high bypass ratio. The fan section 20 of the engine 10 is preferably designed for a particular flight condition—typically cruise at 0.8M and 35,000 feet. As the fan blades within the fan section 20 are efficiently designed at a particular fixed stagger angle for an efficient cruise condition, the VAFN 42 is operated to effectively vary the fan nozzle exit area 44 to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

Figure 1B:
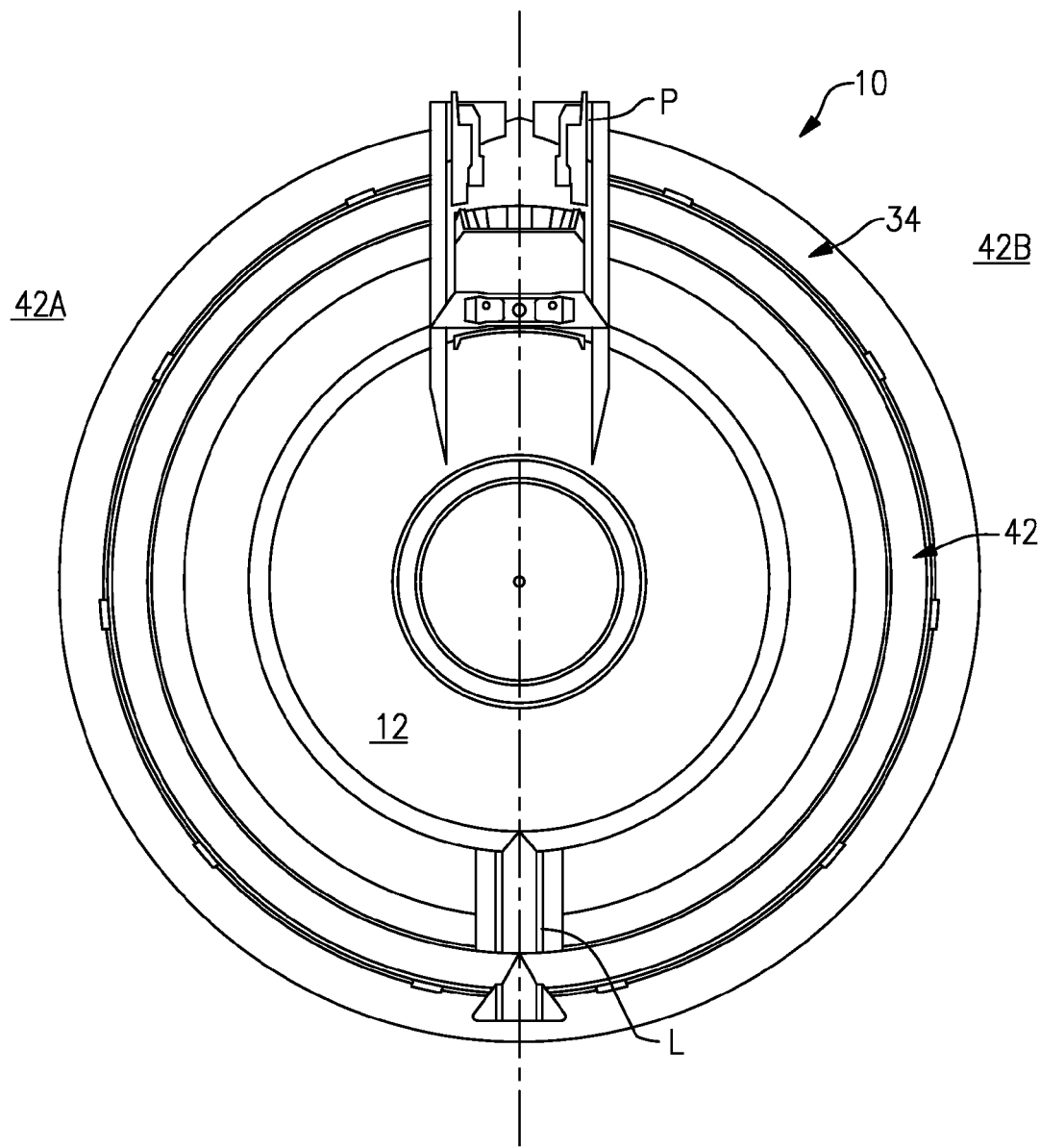
FIG. 1B is a rear view of the engine.
Figure 1C:
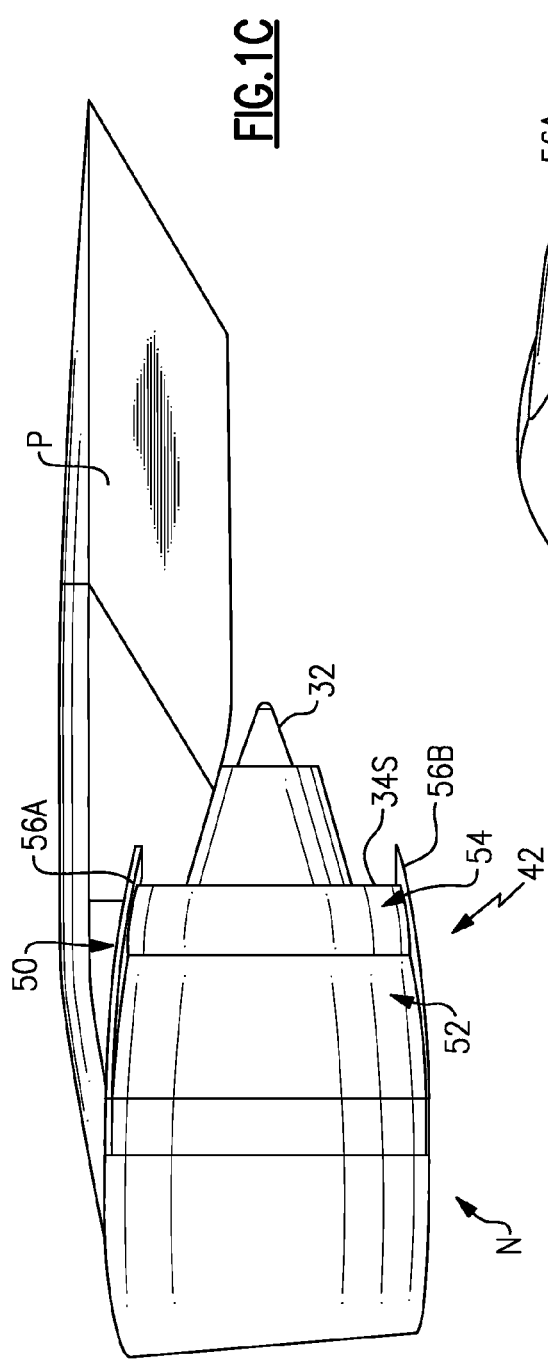
FIG. 1C is a side view of the engine integrated with a pylon.
Figure 1D:
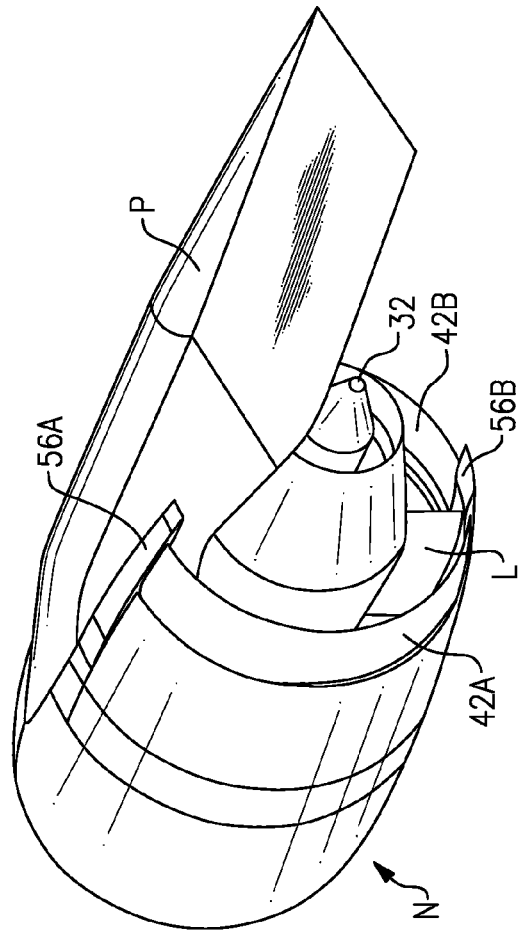
FIG. 1D is a rear perspective view of the engine integrated with a pylon.

The VAFN 42 may be separated into at least two sectors 42A-42B (FIG. 1B) defined between the pylon P and a lower Bi-Fi splitter L which typically interconnects a larger diameter fan duct reverser cowl and a smaller diameter core cowl (FIGS. 1C and 1D). Each of the at least two sectors 42A-42B are independently adjustable to asymmetrically vary the fan nozzle exit area 44 to generate vectored thrust. It should be understood that although two segments are illustrated, any number of sectors and segments may alternatively or additionally be provided.

The VAFN 42 generally includes an auxiliary port system 50 having a first fan nacelle section 52 and a second fan nacelle section 54 movably mounted relative the first fan nacelle section 52. The second fan nacelle section 54 axially slides along the engine axis A relative the fixed first fan nacelle section 52 to change the effective area of the fan nozzle exit area 44. The second fan nacelle section 54, in one non-limiting embodiment, slides aftward upon a track fairing 56A, 56B (illustrated schematically in FIGS. 1C and 1D) in response to an actuator 58 (illustrated schematically). The track fairing 56A, 56B extend from the first fan nacelle section 52 adjacent the respective pylon P and the lower Bi-Fi splitter L (FIG. 1D).

The VAFN 42 changes the physical area and geometry of the bypass flow path 40 during particular flight conditions. The bypass flow B is effectively altered by sliding of the second fan nacelle section 54 relative the first fan nacelle section 52 between a closed position (FIG. 2A) and an open position (FIG. 2B). The auxiliary port system 50 is closed by positioning the second fan nacelle section 54 in-line with the first fan nacelle section 52 to define the fan nozzle exit area 44 as exit area F0 (FIG. 2A).

The VAFN 42 is opened by moving the second fan nacelle section 54 aftward along the track fairing 56A, 56B away from the first fan nacelle section 52 to open an auxiliary port 60 (FIG. 2B) which extends between the open second fan nacelle section 54 relative the first fan nacelle section 52 to essentially provide an increased fan nozzle exit area 44 exit area F1. That is, the exit area F1 with the auxiliary port 60 (FIG. 2B) is greater than exit area F0 (FIG. 2A).

In one non-limiting embodiment, the auxiliary port 60 is incorporated within the bypass flow path 40 aft of the Fan Exit Guide Vanes 36 (FEGVs). The auxiliary port 60 is located through the bypass duct outer wall.

In operation, the VAFN 42 communicates with the controller C to move the second fan nacelle section 54 relative the first fan nacelle section 52 of the auxiliary port system 50 to effectively vary the area defined by the fan nozzle exit area 44. Various control systems including an engine controller or an aircraft flight control system may also be usable with the present invention. By adjusting the axial position of the entire periphery of the second fan nacelle section 54 in which all sectors are moved simultaneously, engine thrust and fuel economy are maximized during each flight regime by varying the fan nozzle exit area. By separately adjusting the sectors of the second fan nacelle section 54 to provide an asymmetrical fan nozzle exit area 44, engine bypass flow is selectively vectored to provide, for example only, trim balance, thrust controlled maneuvering, enhanced ground operations and short field performance.

Figure 3:
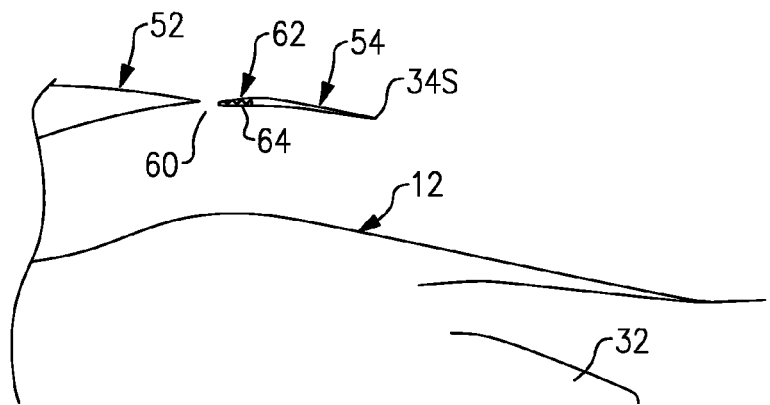
FIG. 3 is a sectional side view of the VAFN with an acoustic system.

Referring to FIG. 3, the second fan nacelle section 54 includes a leading edge region 62 with an acoustic system 64. The acoustic system 64 utilizes the available volume of the leading edge region 62 to achieve an optimal acoustic impedance. It should be understood that the maximum pressure difference across the VAFN primarily occurs in the leading or forward one-third of the second fan nacelle section 54 and that the leading edge region 62 includes at least that area. With optimal acoustic impedance, the acoustic system 64 operates to avoid source radiation from the leading edge and/or attenuate the leading edge noise which thus avoids propagation to the far-field which reduces the total effective perceived noise level (EPNL).

Figure 4:
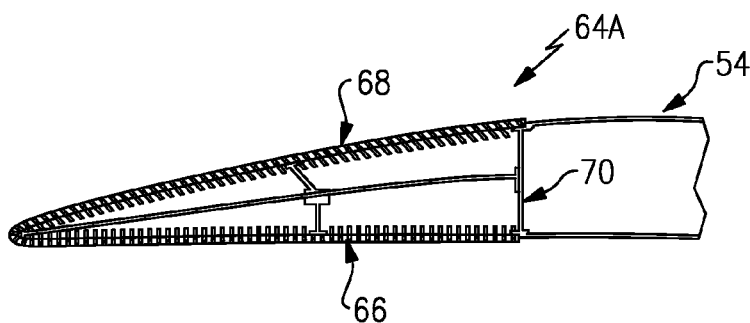
FIG. 4 is a sectional side view of one non-limiting embodiment of the acoustic system.

Referring to FIG. 4, one non-limiting embodiment of the acoustic system 64A includes a perforated inner face sheet 66 and a perforated outer face sheet 68 supported by a structure 70. The micro-porosity of the perforated inner face sheet 66, the micro-porosity of the perforated outer face sheet 68 and the arrangement of the structure 70 are arranged to tune the acoustic system 64A to provide an optimal acoustic impedance and achieve maximum attenuation. The structure 70 ensures local reaction characteristics within the leading edge region 62 through acoustic communication between one or both of the perforated inner face sheet 66 and the perforated outer face sheet 68. It should be understood that the structure 70 is illustrated in partial schematic cross-section and that various arrangements of the structure 70 may be provided to support the perforated inner face sheet 66 and the perforated outer face sheet 68. Although both the perforated inner face sheet 66 and the perforated outer face sheet 68 are illustrated in a single non-limiting embodiment, it should be understood that only one or both of the perforated inner face sheet 66 and the perforated outer face sheet 68 may be utilized.

Figure 5:
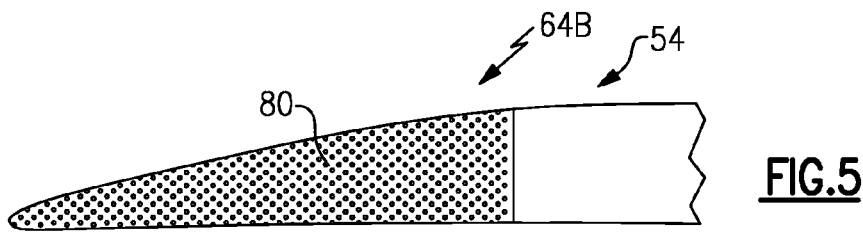
FIG. 5 is a sectional side view of another non-limiting embodiment of the acoustic system.

Referring to FIG. 5, another non-limiting embodiment of the acoustic system 64B includes a bulk absorbing material 80 such as, for example only, a sintered metal, a ceramic foam, Kevlar, or a carbide material to minimize effects on the steady flow through the auxiliary port 60 and maximize effects on unsteady loading. As with the FIG. 4 embodiment, the porosity, depth, and material characteristics are selected for optimal impedance and thus optimal acoustic attenuation.

Figure 6:
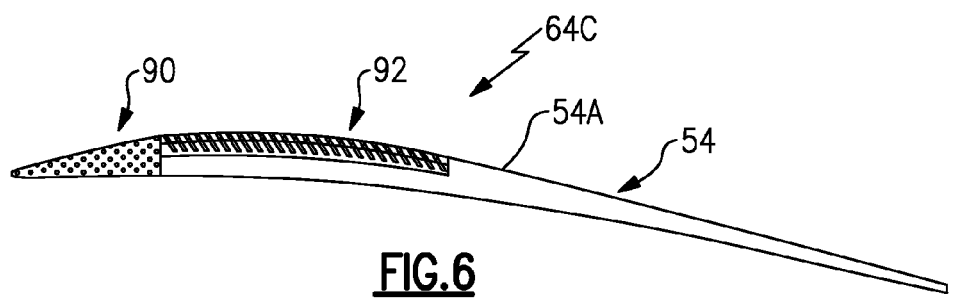
FIG. 6 is a sectional side view of yet another non-limiting embodiment of the acoustic system.

Referring to FIG. 6, another non-limiting embodiment of the acoustic system 64C includes a forward acoustic system 90 and an aft acoustic system 92. The aft acoustic system 92 may provide an additional surface area to supplement performance of the forward acoustic system 90. The forward acoustic system 90 may be the same or different from the aft acoustic system 92. That is, the forward acoustic system 90 may be either the FIG. 4 perforated plate design or the bulk absorber design of FIG. 5 coupled with the aft acoustic system 92 which may be either the FIG. 4 perforated plate design or the bulk absorber design of FIG. 5.

In this non-limiting embodiment, the aft acoustic system 92 is located only along an outer surface 54A of the second fan nacelle section 54. The aft acoustic system 92 may alternatively or additionally include a perforated plate design bounded to partitions in the internal volume or a wire mesh acoustic liner, if a relatively larger attenuation bandwidth is desired.

Noise reduction on the order of approximately 3 EPNdB cumulative over the certification conditions described in Federal Acquisition Regulation (FAR) 36 may be readily achieved by the acoustic system 64 disclosed herein and include both tone and broadband reductions.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A nacelle assembly for a for a high-bypass gas turbine engine comprising:
   a core nacelle defined about an engine centerline axis;
   a fan nacelle mounted at least partially around said core nacelle to define a fan bypass flow path; and
   a variable area fan nozzle in communication with said fan bypass flow path, said variable area fan nozzle having a first fan nacelle section and a second fan nacelle section, said second fan nacelle section axially movable relative said first fan nacelle section to define an auxiliary port at a non-closed position, wherein said acoustic system comprises an outer face sheet; to vary a fan nozzle exit area and adjust fan bypass airflow, said second fan nacelle section having a leading edge region with an acoustic system which provides an acoustic impedance when said second fan nacelle section is positioned at said non-closed position.

2. The assembly as recited in claim 1, wherein said acoustic system further comprises a forward acoustic system and an aft acoustic system, said forward acoustic system different than said aft acoustic system.

3. The assembly as recited in claim 1, wherein said acoustic system comprises a perforated inner face sheet.

4. A nacelle assembly for a for a high-bypass gas turbine engine comprising: a core nacelle defined about an engine centerline axis; a fan nacelle mounted at least partially around said core nacelle to define a fan bypass flow path; and a variable area fan nozzle in communication with said fan bypass flow path, said variable area fan nozzle having a first fan nacelle section and a second fan nacelle section, said second fan nacelle section axially movable relative said first fan nacelle section to define an auxiliary port at a non-closed position to vary a fan nozzle exit area and adjust fan bypass airflow, said second fan nacelle section having a leading edge region with an acoustic system which provides an acoustic impedance when said second fan nacelle section is positioned at said non-closed position, wherein said acoustic system further comprises a forward acoustic system and an aft acoustic system, said forward acoustic system comprises said leading edge of said second fan nacelle section and said aft acoustic system comprises at least a portion of an upper surface of said second fan nacelle section.

5. A nacelle assembly for a for a high-bypass gas turbine engine comprising: a core nacelle defined about an engine centerline axis; a fan nacelle mounted at least partially around said core nacelle to define a fan bypass flow path; and a variable area fan nozzle in communication with said fan bypass flow path, said variable area fan nozzle having a first fan nacelle section and a second fan nacelle section, said second fan nacelle section axially movable relative said first fan nacelle section to define an auxiliary port at a non-closed position to vary a fan nozzle exit area and adjust fan bypass airflow, said second fan nacelle section having a leading edge region with an acoustic system which provides an acoustic impedance when said second fan nacelle section is positioned at said non-closed position, wherein said acoustic system comprises a perforated inner face sheet and a perforated outer face sheet supported by a structure.

6. A nacelle assembly for a for a high-bypass gas turbine engine comprising:
   a core nacelle defined about an engine centerline axis;
   a fan nacelle mounted at least partially around said core nacelle to define a fan bypass flow path; and
   a variable area fan nozzle in communication with said fan bypass flow path, said variable area fan nozzle having a first fan nacelle section and a second fan nacelle section, said second fan nacelle section axially movable relative said first fan nacelle section to define an auxiliary port to vary a fan nozzle exit area and adjust fan bypass airflow, said second fan nacelle section comprises an acoustic system having an acoustic impedance, said acoustic system comprises a forward acoustic system in fluid communication with an aft acoustic system, said forward acoustic system comprises a bulk absorbing material and said aft acoustic system comprises a perforated outer face sheet along at least a portion of an upper surface of said second fan nacelle section.

7. The assembly as recited in claim 6, wherein said second fan nacelle section defines a trailing edge of said variable area fan nozzle.

8. The assembly as recited in claim 6, wherein said second fan nacelle section is subdivided into a multiple of independently operable sectors, each of said multiple of independently operable sectors axially movable relative said the first fan nacelle section to define an asymmetric fan nozzle exit area.

9. A high-bypass gas turbine engine comprising:
   a core engine defined about an axis;
   a gear system driven by said core engine;
   a turbofan driven by said gear system about said axis;
   a core nacelle defined at least partially about said core engine;
   a fan nacelle mounted at least partially around said core nacelle to define a fan bypass flow path; and
   a variable area fan nozzle in communication with said fan bypass flow path, said variable area fan nozzle having a first fan nacelle section and a second fan nacelle section, said second fan nacelle section axially movable relative said first fan nacelle section to define an auxiliary port at a non-closed position, wherein said acoustic system comprises a perforated inner face sheet and a perforated outer face sheet supported by a structure to vary a fan nozzle exit area and adjust fan bypass airflow, said second fan nacelle section having a leading edge region with an acoustic system which provides an acoustic impedance when said second fan nacelle section is positioned at said non-closed position.

10. The engine as recited in claim 9, wherein said acoustic system comprises a bulk absorbing material.

11. The engine as recited in claim 9, wherein said second fan nacelle section defines a trailing edge of said variable area fan nozzle.

12. A method of reducing a total effective perceived noise level of a gas turbine engine with a variable area fan nozzle comprising:

axially moving a second fan nacelle section between a closed position in which the second fan nacelle section is in sequential alignment with a first fan nacelle section in response to a cruise flight condition and an open positioning in which the second fan nacelle section is aftward of the first fan nacelle section to define a auxiliary port in response to a non-cruise flight condition, the second fan nacelle section having a leading edge region with an acoustic system which provides an acoustic impedance when the second fan nacelle section is positioned at a non-closed position.

13. A method as recited in claim 12, further comprising: generating the acoustic impedance with at least a portion of an upper surface of the second fan nacelle section.

* * * * *